Sept. 6, 1932.  F. C. CRUFF ET AL  1,875,857
SCREW VALVE GATE
Filed May 16, 1931  3 Sheets-Sheet 2
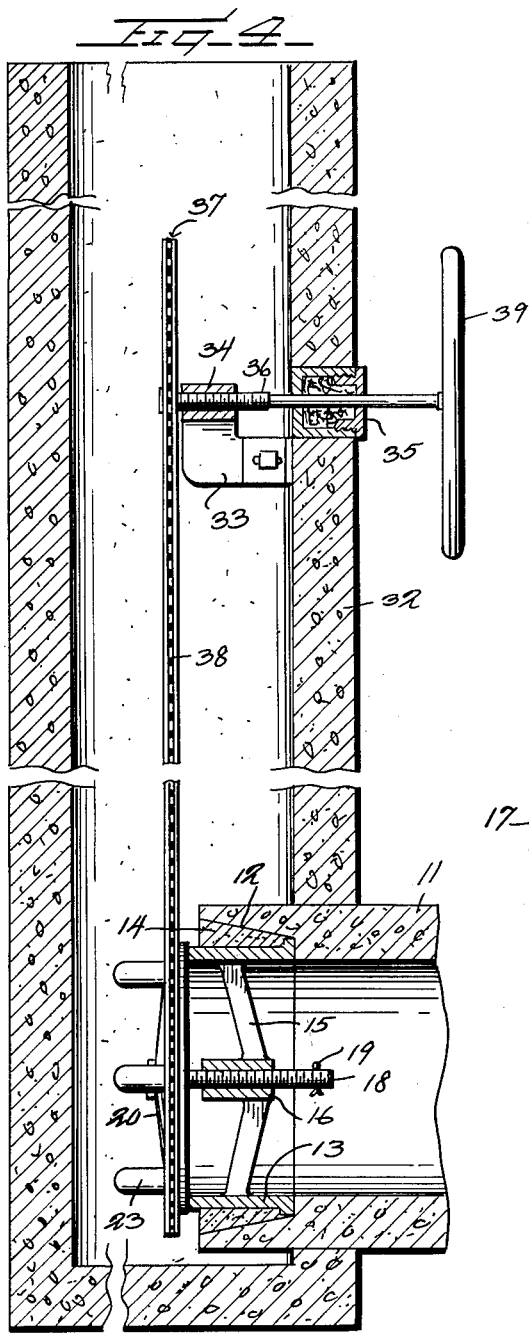
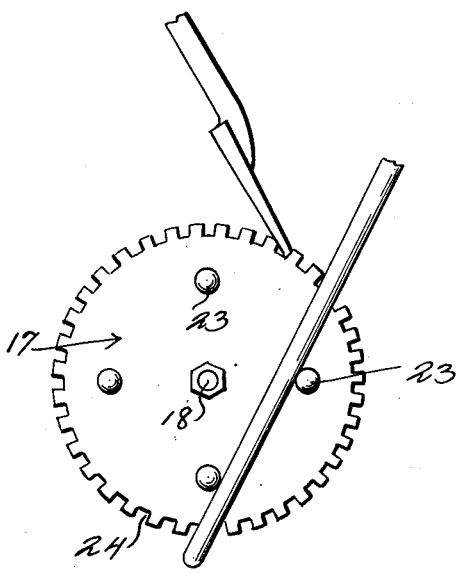
Inventors
F. C. Cruff
A. A. Giuste
By Watson E. Coleman
Attorney Sept. 6, 1932. F. C. CRUFF ET AL 1,875,857
SCREW VALVE GATE
Filed May 16, 1931 3 Sheets-Sheet 3
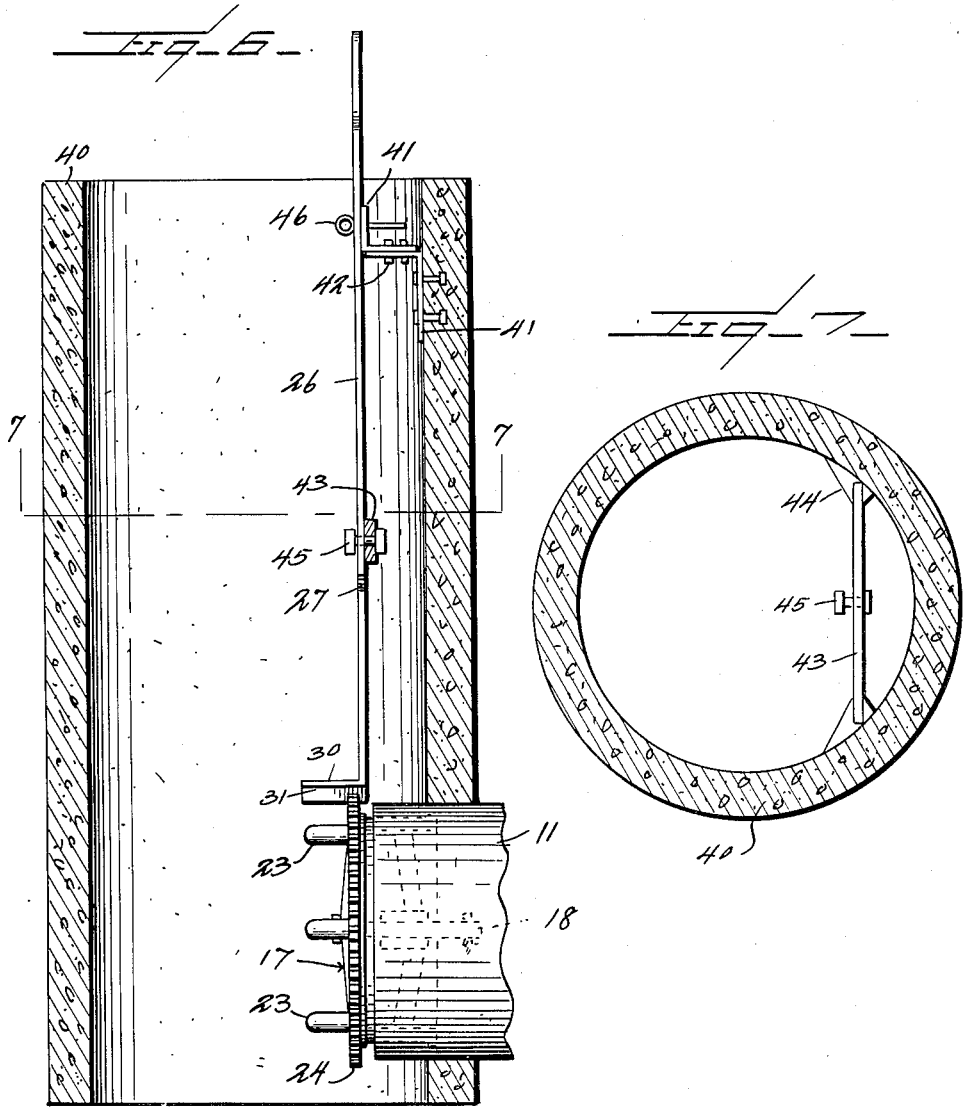
Inventors
F. C. Cruff
A. A. Giuste
By Watson E. Coleman
Attorney Patented Sept. 6, 1932

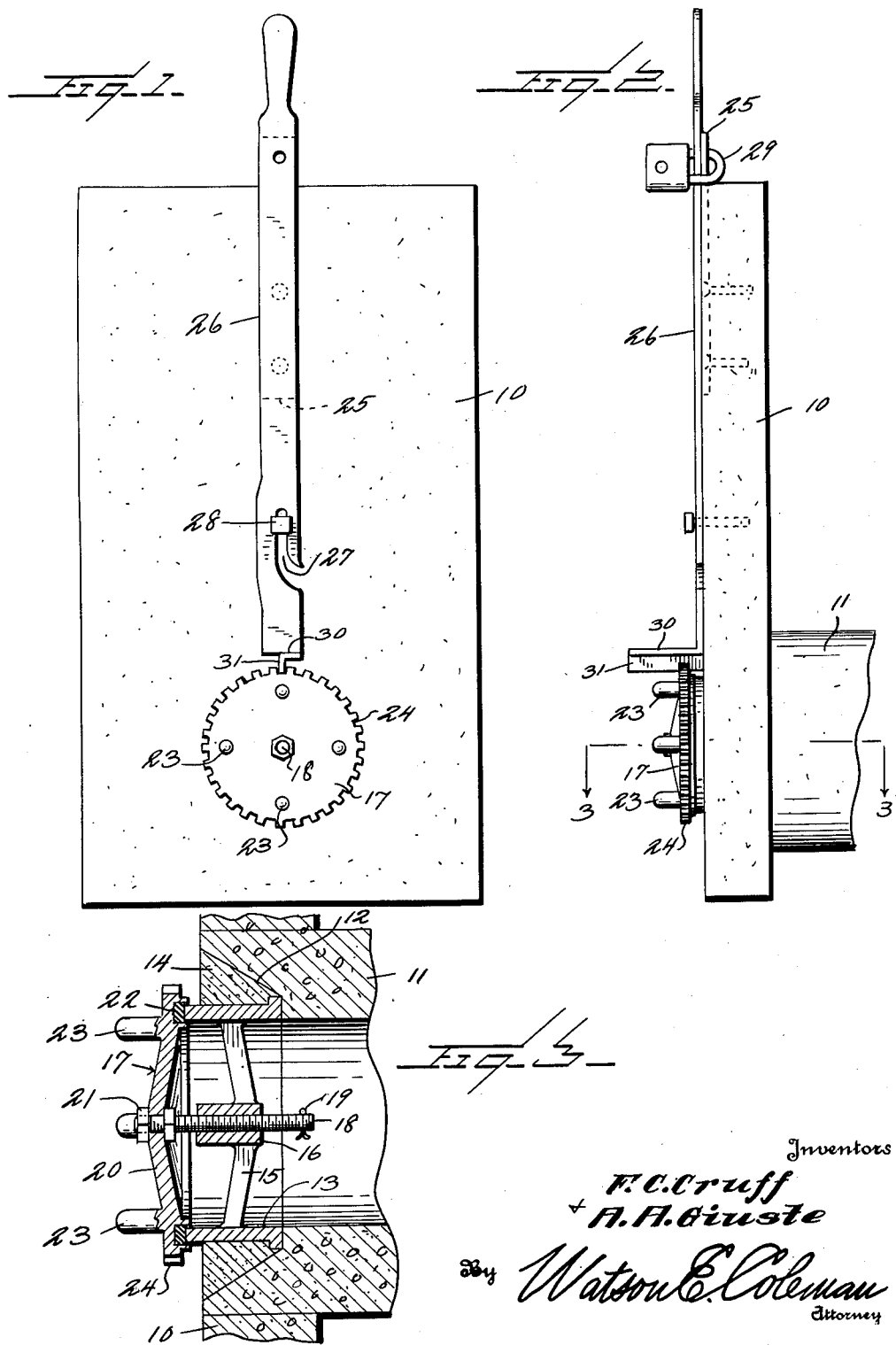

1,875,857

UNITED STATES PATENT OFFICE

FRANCIS C. CRUFF AND ALBERT A. GIUSTE, OF DINUBA, CALIFORNIA

SCREW VALVE GATE

Application filed May 16, 1931. Serial No. 537,923.

This invention relates to water gates or valves and particularly to water gates or valves used in connection with stand pipes such as are used in irrigation works.

The general object of the invention is to provide a very simply constructed valve or gate and means for operating this valve or gate either in a low stand pipe or in a high stand pipe, which gate may be used either in a vertical position or in a horizontal position.

A further object is to provide a valve structure of this character which is particularly efficient for use as a head gate in canals or ditches where water is measured to the consumer and where it is necessary that the valve be locked in any position to which it may be adjusted in order to prevent any unauthorized person from moving the valve.

Another object is to provide a valve which when unlocked may be readily opened to any desired amount or as readily closed, which is simple and yet thoroughly effective for the purpose intended.

Other objects will appear in the course of the following description.

Our invention is illustrated in the accompanying drawings, wherein:—

Figure 1 is a front elevation of one form of water controlling head constructed in accordance with our invention;

Figure 2 is a side elevation of the head;

Figure 3 is a sectional view on the line 3—3 of Figure 2;

Figure 4 is a vertical sectional view of a stand pipe installation constructed in accordance with our invention;

Figure 5 is a top plan view of the horizontally disposed head structure showing the manner in which the valve may be opened;

Figure 6 is a vertical section of another form of stand pipe installation;

Figure 7 is a section on the line 7—7 of Figure 6.

Referring particularly to the construction shown in Figure 1, 10 designates a head wall which is shown as formed of concrete, though any other material may be used and 11 designates the concrete pipe which is flared at its outer end as at 12. Disposed within this flared portion at the mouth of the pipe is an annulus 13 which constitutes the rim or seat of the valve and between the flared inside face of the wall of the pipe and this annulus 13 is sand and cement grouting designated 14. Mounted within the annulus 13 is a spider 15 which may be cast with this annulus or formed in any other desired manner and having a central interiorly screw-threaded hub 16. Operating in connection with the annulus is the valve 17 which has a screw-threaded stem 18 which has threaded engagement with the hub 16 and is provided at its inner end with the cotter pin 19 to limit the outward movement of the annulus. The valve 20 may be connected to the stem in any suitable manner, as for instance by the nuts 21. This valve is formed with an annular groove within which is disposed packing 22, this packing preferably being composed of treated hemp. From the face of the valve 20 project the lugs 23 preferably four in number and the circumferential edge of the gate is formed with teeth 24.

Mounted upon the head wall 10 is a head wall plate 25 held in place by embedded carriage bolts or other means and mounted upon this head wall plate is a lever 26. This lever is formed with a slot 27 which extends downward and laterally and gradually widens toward the edge of the plate so as to form a mouth to the slot. The head wall carries the outwardly projecting pivot bolt 28 with which the slot 27 engages. The upper end of the lever is formed with a handle and the head wall plate extends above the head wall 10 and is provided with apertures for the hasp of a padlock 29 or other locking means which will engage with the handle of the lever to hold the lever locked in position. When the padlock is removed, the lever may be lifted out of its engagement with the pivot bolt or the lever may be inserted and forced fully downward. The lower end of the lever is angularly bent at 30 and this angular end of the lever is formed with the downwardly extending lug or lip 31 adapted to engage with the teeth 24.

It will be obvious now that by oscillating the lever in one direction, the valve may be shifted toward a closed position and by oscillating it in another direction the valve may be shifted toward its fully opened position. The lip 30 has a length equal to the full movement of the valve shown as approximately 2½ inches so that by oscillating the lever in one direction, then raising it, shifting it back to its initial position and again oscillating it, the valve may be moved step by step from its closed to its fully opened position. Of course, it will be understood that the amount of opening movement of the valve and the diameter of the valve may be varied and that a twenty-four inch valve would move outward approximately six inches to its fully opened position.

In Figure 4, we illustrate a stand pipe installation particularly designed for use in a high stand pipe. In this case, the stand pipe is designated 32. The outlet pipe is designated 11 and this outlet pipe is provided with a seat as described and with the spider 15. The valve 20 is of the same general structure as previously described. In this case, however, because of the height of the stand pipe 32, a lever is not used for operating the valve, but there is mounted in the wall of the stand pipe a bracket 33 carrying the threaded bushing 34. A stuffing box 35 is disposed in the wall of the stand pipe and extending through this stuffing box and through the threaded bushing is a screw-threaded shaft 36 carrying upon it a sprocket wheel 37. A sprocket chain 38 extends over this sprocket wheel and engages the teeth 24 on the valve 20.

The screw-threads on the shaft 36 are the same in pitch as the threads on the valve stem 18 and hence it follows that as the shaft 36 is turned by means of the hand wheel 39, the sprocket wheel 37 will move in the same direction and at the same speed as the valve 20. The sprocket chain 38 is preferably nonrustable and obviously any desired length of sprocket chain may be used and thus the device is particularly adapted to deep stand pipes.

In Figure 6, we show a low stand pipe installation wherein 40 is the stand pipe, 41 an angular bracket attached to the stand pipe, 42 an angular bracket section adjustably mounted upon the bracket 41 by means of the bolt or bolts 42. The lever 26 is pivotally mounted upon a supporting iron 43 mounted on the inside of the concrete pipe 40, as for instance by the concrete 44. The lever 26 is pivoted at 45. The remainder of the construction is precisely the same as that shown in Figures 1 to 4. It, therefore, requires no further description, the same numerals being used for this part of the construction. The lever may be held or locked in its adjusted position by a pin, bolt or other latching or locking device passed through the angle iron 41. Such a pin is designated 46 but a padlock may be used for this purpose.

In either of the constructions shown in Figures 1 and 6, the valve may be initially moved by oscillating the lever upon its pivot and engaging it with the teeth 24 in Figure 1 or 6 and then when the valve is free to move, the lever may be removed and the speed of the opening or closing of the valve regulated by inserting the lip of the lever in the cogs or teeth and pulling upward on the lever. The lever is also oscillated upon its pivot when it is desired to secure the final closing of the valve.

Obviously also the lever may be detached from its pivot and engaged with the lugs 23 for forcing the valve to its absolutely closed position. Our improved valve may be installed in a horizontal position as illustrated in Figure 5 without any material change in design, but in this case, the valve, which is the same as illustrated in Figure 3 and designated 17, is used without the lever 26. In this case, the valve may be closed or opened by disposing a shovel handle or handle of any other implement in engagement with the lugs 23 of the valve and thus leverage may be exerted to turn the valve until it will move freely. Then by inserting the blade of the shovel into the teeth on the edge of the valve, the valve may be spun to a complete opening in a few seconds. The reverse process is used in, of course, closing the valve.

While this valve has been illustrated in connection with a concrete pipe, it will be understood, of course, that it may be used with other forms of pipe and that it may be used in other situations than for a head gate for stand pipes or as a valve in irrigation constructions. We do not wish to be limited to the details of construction as obviously these might be varied without departing from the spirit of the invention as defined in the appended claims.

We claim:—

1. A water gate including a pipe having a seat and having a spider formed with an interiorly screw-threaded hub, a valve coacting with the seat and having peripheral teeth, a screw-threaded stem engaging the hub, and means for operating the valve including a lever pivoted intermediate its ends and at its end adjacent the valve being provided with an outwardly projecting lip engaging the teeth of the valve and projecting outward a distance equal to the range of movement of the valve, the lever being oscillatable and vertically movable to bring it into engagement with different teeth after each oscillation.

2. A water gate including a pipe having a seat and having a spider formed with an interiorly screw-threaded hub, a valve coacting with the seat and having peripheral teeth, a screw-threaded stem engaging the hub, and means for operating the valve including a lever pivoted intermediate its ends and at its end adjacent the valve being provided with an outwardly projecting lip engaging the teeth of the valve and projecting outward a distance equal to the range of movement of the valve, the lever being provided with an inwardly and upwardly extending slot intermediate its length engageable with the pivot bolt whereby the lever may be oscillated or vertically shifted or removed.

3. A water gate including an element having a seat, an internally threaded member formed with the seat, a valve coacting with the seat, a screw-threaded stem engaging the threaded member and carried by the valve whereby as the valve is rotated in one direction or the other, it will be shifted toward or from the seat, the circumference of the valve being toothed and the face of the valve being provided with outwardly extending studs, means for operating the valve including a lever, a pivot for the lever with which the lever is detachably connected, the lever at its end adjacent the valve being provided with an outwardly projecting lip engaging the teeth of the valve and projecting outward a distance equal to the range of movement of the valve, the lever being oscillatable and vertically movable to bring it into engagement with different teeth after each oscillation, the lever being removable from its pivot so that it may be engaged with the outwardly projecting studs on the face of the valve.

4. A water gate including an element having a seat, the seat being provided with an internally screw-threaded member, a valve coacting with the seat and having peripheral teeth, and a screw-threaded stem engaging the threads of said member whereby as the valve is rotated in one direction or the other, it may be moved toward or from the seat, and means for operating the valve including a lever pivoted intermediate its ends and at its end adjacent the valve being provided with an outwardly projecting lip engaging the teeth of the gate valve and projecting outward a distance equal to the range of movement of the valve, the lever being oscillatable and being vertically movable to bring it into engagement with different teeth after each oscillation.

In testimony whereof we hereunto affix our signatures.

FRANCIS C. CRUFF.
ALBERT A. GIUSTE.